(12) United States Patent
Kolu et al.

(10) Patent No.: US 6,175,623 B1
(45) Date of Patent: Jan. 16, 2001

(54) PROCEDURE FOR THE MANAGEMENT OF A SUBSCRIBER DATABASE IN A TELEPHONE EXCHANGE

(75) Inventors: Minja Kolu; Paivi Söderström, both of Helsinki (FI)

(73) Assignee: Nokia Telecommunications Oy, Espoo (FI)

( * ) Notice: Under 35 U.S.C. 154(b), the term of this patent shall be extended for 0 days.

(21) Appl. No.: 09/273,800

(22) Filed: Mar. 18, 1999

Related U.S. Application Data

(63) Continuation of application No. PCT/FI97/00535, filed on Sep. 9, 1997.

(30) Foreign Application Priority Data

Sep. 19, 1996 (FI) .......................................... 963727

(51) Int. Cl.⁷ ...................................................... H04M 7/00
(52) U.S. Cl. ........................... 379/229; 379/207; 379/230
(58) Field of Search .................................. 379/201, 207, 379/220, 221, 229, 230; 370/424, 437, 438, 264

(56) References Cited

U.S. PATENT DOCUMENTS

| | | | |
|---|---|---|---|
| 4,635,189 | 1/1987 | Kendall | 707/10 |
| 5,029,161 | 7/1991 | Nagashima | 370/398 |
| 5,315,594 * | 5/1994 | Noser | 370/353 |
| 5,381,405 * | 1/1995 | Daugherty et al. | 370/355 |
| 5,386,417 * | 1/1995 | Daugherty et al. | 370/352 |
| 5,398,335 | 3/1995 | Lewis | 707/3 |
| 5,640,196 * | 6/1997 | Behrens et al. | 348/14 |
| 5,751,574 * | 5/1998 | Loebig | 364/187 |
| 5,754,555 * | 5/1998 | Hurme et al. | 370/522 |
| 5,781,623 * | 7/1998 | Khakzar | 379/230 |
| 5,802,177 * | 9/1998 | Daniel et al. | 380/270 |
| 5,910,980 * | 6/1999 | Ogasawara et al. | 379/142 |
| 5,920,569 * | 7/1999 | Loebig | 370/424 |
| 5,956,343 * | 9/1999 | Cornes et al. | 370/437 |
| 6,009,085 * | 12/1999 | Lechner | 370/324 |
| 6,047,061 * | 4/2000 | Cornes et al. | 379/333 |
| 6,052,589 * | 4/2000 | Persson et al. | 455/433 |
| 6,069,948 * | 5/2000 | Yrjana | 379/230 |

FOREIGN PATENT DOCUMENTS

| | | |
|---|---|---|
| 5-153646 | 6/1993 | (JP) . |
| 6-253007 | 9/1994 | (JP) . |
| 8-79370 | 3/1996 | (JP) . |

OTHER PUBLICATIONS

Jan. 29, 1998, International Search Report for International Application No. PCT/FI97/00535.

* cited by examiner

*Primary Examiner*—Krista Zele
*Assistant Examiner*—Benny Q. Tieu
(74) *Attorney, Agent, or Firm*—Altera Law Group, LLC

(57) ABSTRACT

The present invention relates to a procedure for managing a subscriber database maintained in a telephone exchange on the basis of changes occurring in the subscriber data. Thanks to the invention, ranges unlimited in respect of location, size and number can be reserved and released in the database for V5 interfaces.

20 Claims, 1 Drawing Sheet

PROCEDURE FOR THE MANAGEMENT OF A SUBSCRIBER DATABASE IN A TELEPHONE EXCHANGE

This application is a continuation of International PCT/FI97/00535 filed Sep. 9, 1997.

FIELD OF THE INVENTION

The present invention relates to a procedure for managing a subscriber database maintained in a telephone exchange on the basis of changes in subscriber data.

DESCRIPTION OF RELATED ART

The management of subscriber data in a telephone exchange includes the management of all data relating to the subscriber. Subscriber data are maintained in a subscriber database. Subscriber data are used in conjunction with invoicing, dialling and other functions associated with the telephone exchange and setup of calls by subscribers.

In this application, 'decimal position' refers to a so-called decimal position number of the subscriber, which in the telephone exchange database corresponds to the record number of e.g. a file called Interfaces. Decimal position range refers to an area in this file.

In earlier practice, decimal position numbers were only used for local interfaces. The subscriber module always has a constant number of interface positions; therefore, a constant-sized range of decimal positions is reserved for a local interface when a module is being created. The size of the range cannot be changed. Thus, it can be assumed that each module has one continuous decimal position range reserved for it.

To facilitate the operations pertaining to a given module, there is a directory in which a reference to the beginning of the decimal position range of the module is stored when the module is being created. When operations are to be carried out on the entire module, the beginning of the decimal position range is obtained from the directory and the file is read from that point onward until a record belonging to another module is encountered.

At present, decimal position numbers are also used for V5 interfaces. V5 interfaces (V5.1 and V5.2) are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. A dynamic concentrator interface V5.2 consistent with the ETS 300 347-1 and 347-2 standards consists of one or more (1–16) PCM (Pulse Code Modulation) cables. One PCM cable comprises 32 channels, each of which with a transfer rate of 64 kbit/s, i.e. 2048 kbit/s in all. The V5.2 interface supports analogue telephones as used in the public telephone network, digital, such as ISDN (Integrated Services Digital Network) basic and system subscriptions as well as other analogue or digital terminal equipment based on semi-fixed connections. A static multiplexer interface consistent with the ETS 3000 324-1 and 324-2 standards consists of one 2048 kbit/s PCM cable. Except for the ISDN system subscription, the V5.1 interface supports the same subscriber types as the V5.2 interface.

When a V5 interface is being created, the number of subscribers that may be comprised in the interface cannot be known for sure. Therefore, in the case of V5 interfaces, it must be possible to reserve and release decimal position ranges as needed after the interface has been created. Thus, a V5 interface may have an arbitrary number of decimal position ranges of different sizes reserved for it. Between the ranges there may be a vacant range, a range reserved for another V5 interface or a range reserved for a local interface or all or these.

For each V5 interface, the directory may contain one reference, several references or no references, depending on the number of decimal position ranges existing for the interface and on whether there are free or reserved records between them. If there are only free records between the ranges belonging to the same V5 interface, the latter range is not included in the directory because the file browsing structure of the TDL language used for processing the data in the database skips free records.

The problem is on what basis the directory is to be updated when ranges are reserved or released in the database.

SUMMARY OF THE INVENTION

The object of the present invention is to eliminate the aforesaid problem. A specific object of the present invention is to present a new type of procedure for updating the directory in a telephone exchange when decimal position ranges are reserved or released in the database.

As for the features characteristic of the present invention, reference is made to the claims.

In the procedure of the invention for the management of the subscriber data of a subscriber database in a telephone exchange with a V5 interface and/or local interface connected to it, a decimal position range is reserved for local subscribers in conjunction with the creation of a subscriber module. The range is released when the module is deleted. The decimal position range or ranges for a V5 interface are reserved and released by a separate command or in conjunction with the creation or deletion of the subscriber. Further, in the procedure of the invention, data indicating the locations of the decimal position ranges are updated in a directory. According to the invention, the directory is updated on the basis of the content of the range preceding and/or the range following the decimal position range to be reserved or released. A decimal position range may comprise one or more decimal positions.

Thus, the directory operations pertaining to the reservation of a decimal position range are greatly dependent on the content of the ranges or records surrounding the range to be reserved, and also on whether a part of the range to be reserved has already been reserved for the same V5 interface or for some other purpose.

The inference process relating to the updating of the directory data is as follows. If the range to be reserved or a part of it has already been reserved for another V5 or local interface, no reservation can be made and therefore no directory operation is needed. On the other hand, if the range to be reserved or a part of has already been reserved for the same V5 interface as the range currently to be reserved, the directory operation is very easy. The range previously reserved is removed from the directory if it is present in it, and the range to be reserved is added to the directory. No other directory operations are needed.

Generally, the range to be reserved is completely free before the reservation. Before a range reservation is made, the reserved range preceding the range to be reserved is examined to establish whether it belongs to the same V5 interface, a different V5 interface or a local interface. If the range belongs to the same V5 interface, then the range to be reserved need not be added to the directory. If the range belongs to a local interface or another V5 interface, then the range to be reserved has to be added to the directory.

After the range preceding the range to be reserved has been checked, an actual reservation is made and at the same time the range being reserved is added to the directory if this is necessary according to the principles described above. Upon reserving the range, the procedure verifies whether the range following the reserved range needs to be present in the directory.

The range following next after the reserved range may belong to the same V5 interface, a different V5 interface or a local interface. If this next range belongs to a local interface, no further directory operations are needed. If the next range belongs to the same V5 interface as the reserved range and the range preceding the reserved range did not belong to the same V5 interface as the reserved range, then the range must be deleted from the directory. If the next range belongs to a different V5 interface than the reserved range but to the same V5 interface as the range preceding the reserved range, then the range must be added to the directory.

Further, if all three ranges belong to different V5 interfaces, then only the reserved range has to be added to the directory. If all three ranges belong to the same V5 interface, no changes are needed in the directory.

When a range belonging to a given V5 interface is to be released, the range preceding it and the range following it have to be examined in the same way as when a range is being reserved. In an embodiment, the properties of the TDL language used for the data processing comprise automatic deletion of the directory reference relating to a range being released.

If all three ranges, i.e. the preceding range, the range to be released and the next range, belong to different V5 interfaces or to local interfaces, then no directory operations are needed. Similarly, no directory operations are needed in the case where all three ranges belong to the same V5 interface.

If the range preceding a released range belongs to another V5 interface or to a local interface but the next range belongs to the same V5 interface, then the next range has to be added to the directory. If the range preceding and the range following a released range belong to one and the same V5 interface that is different from the released range, then the range following the released range must be deleted from the directory.

It is possible to release one, a few or all of the decimal position ranges of a V5 interface at a time. When a decimal position range of a V5 interface is to be released, first the range preceding the range to be released is examined, whereupon records are released as long as they belong to the V5 interface in question. Upon encountering the first record belonging to a different interface, a directory operation is carried out in accordance with the principles described above. After that, the procedure continues reading the file until the next record belonging to the V5 interface to be released is encountered, and that record is released. The procedure continues releasing records until it encounters a record belonging to a different interface. The procedure now naturally knows what the preceding range contains, so the directory operation is easy to carry out. This process is continued until a final limit set by the initiator of the process or the end of the file is encountered.

In the case of a local interface, the directory operation is considerably simpler. The subscriber module of a local interface can only have one continuous range, which is reserved when the module is created and which must not be changed. Therefore, no reservation can be made if the range to be reserved already contains reserved records. A reserved range is always added to the directory.

When a range is to be reserved for the subscriber module of a local interface, it is necessary to verify whether a range between two ranges belonging to the same V5 interface is being reserved. If this is the case, then the latter decimal position range must be added to the directory. No other changes in the directory are needed.

When a decimal position range reserved for the subscriber module of a local interface is being released, it must be verified whether the released range was located between two ranges belonging to the same V5 interface. If so, then the reference to the range following the released range must be deleted from the directory.

As compared with prior art, the present invention has the advantage that it allows the reservation of decimal positions for V5 subscribers. Moreover, the procedure of the invention is more flexible in respect of the size, location and number of decimal position ranges to be reserved.

BRIEF DESCRIPTION OF THE DRAWINGS

In the following, the invention will be described by the aid of a few examples of its embodiments by referring to the attached drawing, in which.

DETAILED DESCRIPTION OF THE INVENTION

In FIG. 1a–1e, the content of the database of the invention is presented in diagrammatic form. The principle is that in each figure the assembly of objects in the database or a part of it is represented by an area delimited by a rectangle, inside which are depicted an area representing the range E preceding a range to be reserved, an area representing the range S following the range to be reserved and an area representing the range V to be reserved.

Figure 1A:
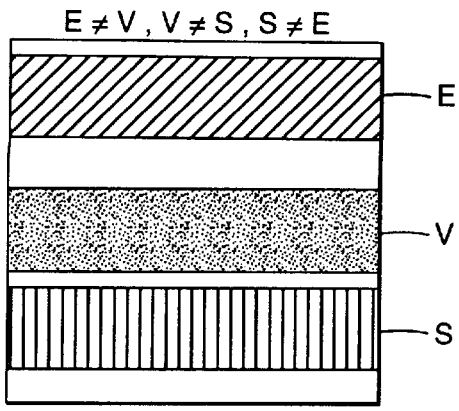
FIGS. 1a–1e show diagrams representing possible database contents according to the present invention.

In FIG. 1a, all the ranges belong to different interfaces, for instance so that range E belongs to a local interface, S to a first V5 interface and V to a second V5 interface. In this situation, the directory contains references to range E and range S, and a reference to range V has to be added to the directory because the range preceding it belongs to a different interface. if range V is released, the corresponding directory reference is deleted automatically and no directory operation is needed.

Figure 1B:
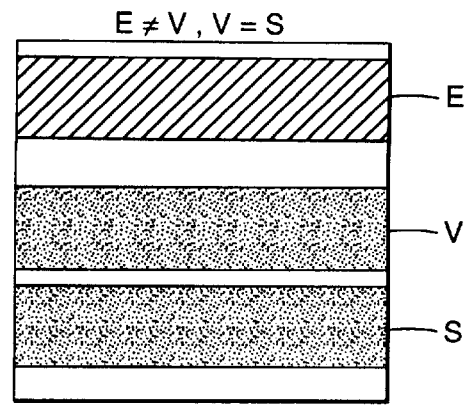

In FIG. 1b, the range V to be reserved and the next range S belong to the same V5 interface. The preceding range E belongs to a different interface, e.g. another V5 interface. In this situation, the directory contains a reference to range E and when range V is being reserved, the reference to range S is deleted from the directory and a reference to range V is added. When range V is released, the corresponding reference is deleted automatically; therefore, there is now no reference to range S, and a reference to range S has to be added to the directory.

Figure 1C:
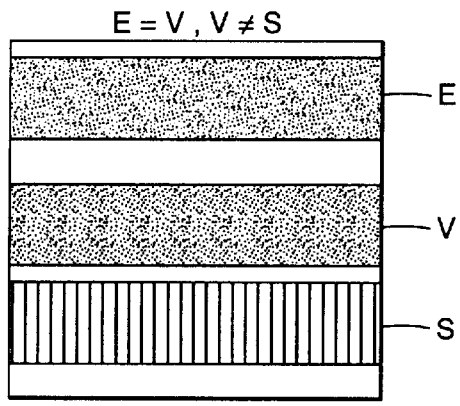

In FIG. 1c, the preceding range E and the range V to be reserved belong to the same V5 interface, whereas the next range S belongs to a different interface, e.g. another V5 interface. In this situation, the directory contains references to the preceding range and to the next range. Therefore, when range V is reserved, no directory operation is needed because the reference to the preceding range also refers to the range to be reserved. Neither is a directory operation needed when range V is released.

Figure 1D:
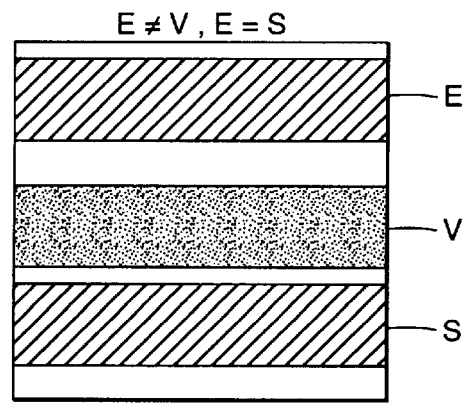

In FIG. 1d, the preceding range E and the next range S belong to the same interface, e.g. a first V5 interface, whereas the range V to be reserved belongs to a different interface, e.g. another V5 interface. In this situation, the directory contains a reference to the preceding range, but no reference to the next range S. In this case, when range V is being reserved, a corresponding reference is added to the directory. Moreover, a reference corresponding to the next range S has to be added to the file. When range V is released, the reference corresponding to it is deleted automatically. In addition, the reference corresponding to the next range S has to be deleted from the directory because the reference corresponding to the preceding range refers to the next range S as well.

Figure 1E:
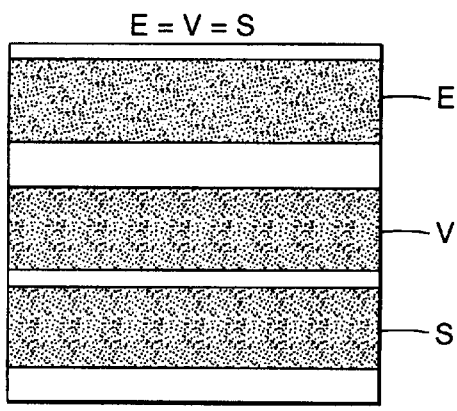

In FIG. 1e, all the ranges belong to the same V5 interface. In this case, no directory operations are needed when range V is being reserved or released.

The invention is not restricted to the examples of its embodiments described above, but instead many variations are possible within the framework of the inventive idea defined by the claims.

What is claimed is:

1. A method for the management of subscriber data of a subscriber database in a telephone exchange with a V5 interface and/or local interface connected to it, in which method a decimal position range (V) is reserved in the subscriber database for a subscriber in conjunction with the creation of a subscriber module for a V5 interface and the decimal position range is released when the subscriber is removed, so that a decimal position range reserved for an interface exists when a subscriber has been created for that interface, and in which method data indicating the locations of the decimal position ranges are updated in a directory, wherein the directory is updated on the basis of the content of a range (E) preceding and/or a range (S) following the decimal position range (V) to be reserved or released.

2. The method as defined in claim 1, wherein the interface to which the range (E) preceding the range (V) to be reserved belongs as well as the interface to which the range (S) following the range (V) to be reserved belongs are determined and the directory is updated on the basis of this determination.

3. The method as defined in claim 1, wherein if a range (V) to be reserved for a V5 interface or a part of such a range belongs to the same V5 interface, a reference corresponding to this range already reserved is deleted from the directory and a reference corresponding to the range (V) to be reserved is added to the directory.

4. The method as defined in claim 1, wherein if the preceding range (E) belongs to the same V5 interface, the directory need not be updated.

5. The method as defined in claim 1, wherein if the preceding range (E) belongs to a different V5 interface or a local interface, a reference corresponding to the range (V) to be reserved is added to the directory.

6. The method as defined in claim 3, wherein if the next range (S) belongs to a local interface, the directory updating process is stopped.

7. The method as defined in claim 3, wherein if the next range (S) belongs to the same V5 interface as the range (V) to be reserved and the preceding range (E) belongs to a local interface or a different V5 interface, then the reference to the next range (S) is deleted from the directory.

8. The method as defined in claim 3, wherein if the range (S) belongs to a different V5 interface than the range (V) to be reserved and the preceding range (E) belongs to the same V5 interface as the next range (S), then a reference corresponding to the next range (S) is added to the directory.

9. The method as defined in claim 1, wherein if all three ranges belong to different V5 interfaces, only a reference to the range (V) to be reserved is added to the directory.

10. The method as defined in claim 1, wherein the interface to which the range (E) preceding a range (V) to be released belongs and the interface to which the range (S) following the range (V) to be released belongs are determined and the directory is updated on the basis of this determination.

11. The method as defined in claim 1, wherein if all three ranges belong to different V5 interfaces, then the directory need not be updated.

12. The method as defined in claim 1, wherein if all three ranges belong to the same V5 interface, then the directory need not be updated.

13. The method as defined in claim 1, wherein if the preceding range (E) belongs to a different V5 interface or a local interface and the next range (S) belongs to the same V5 interface as the range (V) to be released, then a reference corresponding to the next range (S) is added to the directory.

14. The method as defined in claim 1, wherein if the preceding range (E) and the next range (S) belong to one and the same V5 interface that is different from the V5 interface corresponding to the range (V) to be released, then the reference corresponding to the next range (S) is deleted from the directory.

15. The method as defined in claim 10, wherein one or more ranges are released at a time.

16. The method as defined in claim 1, wherein it comprises determining the interface(s) to which the range (V) to be reserved for the subscriber module of a local interface, the range (E) preceding the range to be reserved and the range (S) following the range (V) to be reserved belong and that the directory is updated on the basis of this determination.

17. The method as defined in claim 2, wherein if the range (V) to be reserved or a part of it belongs to another interface, then the range reservation process is stopped.

18. The method as defined in claim 16, wherein if the preceding range (E) and the next range (S) belong to the same V5 interface, a reference corresponding to the next range (S) is added to the directory.

19. The method as defined in claim 1, wherein it comprises determining the interface(s) to which the range (V) to be released for the subscriber module of a local interface, the range (E) preceding the range to be released and the range (S) following the range (V) to be released belong and that the directory is updated on the basis of this determination.

20. The method as defined in claim 19, wherein if the preceding range (E) and the next range (S) belong to the same V5 interface, the reference corresponding to the next range (S) is deleted from the directory.

* * * * *